(12) United States Patent
Thiex et al.

(10) Patent No.: US 10,039,267 B1
(45) Date of Patent: Aug. 7, 2018

(54) BIOMETRIC AND LOCATION MONITORING METHOD, DEVICE AND SYSTEM

(71) Applicants: Travis Thiex, Volga, SD (US); Chad Wosje, Volga, SD (US)

(72) Inventors: Travis Thiex, Volga, SD (US); Chad Wosje, Volga, SD (US)

(*) Notice: Subject to any disclaimer, the term of this patent is extended or adjusted under 35 U.S.C. 154(b) by 0 days.

(21) Appl. No.: 15/413,840

(22) Filed: Jan. 24, 2017

(51) Int. Cl.
*G06Q 90/00* (2006.01)
*A01K 29/00* (2006.01)
*A01K 11/00* (2006.01)
*A01K 15/02* (2006.01)
*G06Q 10/08* (2012.01)
*G06K 7/10* (2006.01)

(52) U.S. Cl.
CPC .......... *A01K 29/005* (2013.01); *A01K 11/004* (2013.01); *A01K 11/008* (2013.01); *A01K 15/023* (2013.01); *G06K 7/10297* (2013.01); *G06Q 10/087* (2013.01)

(58) Field of Classification Search
CPC ............. G06F 19/3418; G06F 19/3406; A61B 5/0002; A61B 5/0022; A61B 5/0205; A61B 5/746; A61B 5/681; A61B 5/024
USPC ............ 235/379, 385; 340/286.07, 506, 540, 340/539.11, 539.12, 539.13, 573.1
See application file for complete search history.

(56) References Cited

U.S. PATENT DOCUMENTS

| | | |
|---|---|---|
| 6,375,612 B1 | 4/2002 | Guichon et al. |
| 8,823,515 B2 | 9/2014 | Rettedal et al. |
| 8,979,757 B2 | 3/2015 | Mottram et al. |
| 2002/0010390 A1 | 1/2002 | Guice et al. |
| 2005/0145187 A1 | 7/2005 | Gray |
| 2011/0148639 A1* | 6/2011 | Geissler ............... A01K 11/004 340/573.1 |
| 2015/0282457 A1 | 10/2015 | Yarden |
| 2015/0351369 A1 | 12/2015 | Frazier et al. |
| 2016/0135433 A1 | 5/2016 | Harty et al. |
| 2016/0157979 A1 | 6/2016 | Dinger et al. |

FOREIGN PATENT DOCUMENTS

CA        2591902        12/2008

* cited by examiner

*Primary Examiner* — Jamara Franklin (57) ABSTRACT

The present disclosure provides a device, apparatus and method for biometric and location monitoring of an animal. The device comprises an animal monitoring tag with sensor (s) for collecting biometric and location data, and a wireless transceiver. An apparatus for biometric and location monitoring of an animal, comprises the device operatively connected to a system including a wireless transceiver, a server, a set of algorithms for determining the presence of any conditions related to the animal; and an alert means. A method of biometric and location monitoring includes the steps of monitoring and collecting animal data via a device installed on an animal, transmitting the data to the system, analyzing the animal data with a set of algorithms to identify any conditions related to the animal, and generating a message concerning the condition of the animal.

20 Claims, 5 Drawing Sheets

BIOMETRIC AND LOCATION MONITORING METHOD, DEVICE AND SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relate to cattle tags and more particularly to a new biometric and location monitoring method, system and device, which includes or utilizes an animal tag that is a biometric and location monitoring device for livestock.

BRIEF SUMMARY OF THE INVENTION

An embodiment of the disclosure meets the needs presented above by generally comprising a biometric and location monitoring system or method which includes or utilizes an animal tag for cattle or other livestock which includes a plurality of sensors to collect biometric and location data concerning the animal being monitored. The plurality of sensors may be location or movement sensors, biometric sensors or environmental sensors. The location or movement sensors may be any suitable location or movement sensor, including a Global Positioning System (hereinafter "GPS"), or an accelerometer. The biometric sensors are capable of collecting data concerning heart rate, O2, temperature, or other physiological parameter concerning the animal being monitored. The environmental sensors are capable of collecting ultraviolet A and ultraviolet B (hereinafter "UVA and UVB" or "UVA-B"), and temperature data. The tag also comprises a wireless transmitter which transmits the collected biometric and location data to a wireless fidelity or wireless Internet (hereinafter "wireless") transceiver. In one embodiment the data will be transmitted to a server, and processed with computer executable instructions or algorithms to determine the general wellness of an animal, identify a particular health condition being monitored, and/or determine a course to be taken in the animal's care.

In one aspect, the disclosure provides a system for biometric and location monitoring of an animal, the system comprising:

a) an animal identification and monitoring tag for installation on an animal to be monitored, the tag being capable of collecting and wirelessly transmitting animal data; and b) a biometric and location monitoring apparatus operatively connected to the animal and identification monitoring tag, and being capable of analyzing animal data, the system comprising:

i) a database containing a set of algorithms for determining a plurality of conditions related to the animal;

ii) a website into which user data is entered, the data comprising an identification number of the animal tag assigned to the animal being monitored, RFID information associated with the animal tag, and GPS data of an area in which the animal wearing the animal tag is to be monitored for biometric and location information concerning the animal;

iii) a wireless transceiver;

iv) at least one server;

v) a database containing the set of algorithms for determining a plurality of conditions related to the animal;

the apparatus being capable of analyzing the information based on the algorithms, determining whether a plurality of conditions related to the animal are present; and generating a notification message to a caretaker notifying the caretaker of the condition of the animal.

In another aspect, the disclosure provides a method of biometric and location monitoring of an animal comprising the steps of:

a) providing a system for biometric and location monitoring of an animal, the system comprising an animal identification and monitoring tag device operatively connected to a biometric and location monitoring apparatus, the tag device comprising a plurality of biometric and location sensors, and the monitoring apparatus comprising a database containing a set of algorithms for determining a plurality of conditions related to the animal;

b) installing the animal monitoring device on an animal to be monitored;

c) starting the system;

d) entering user data into a website, the data comprising an animal identification number assigned to the animal, radio frequency identification device (hereinafter "RFID") information associated with the animal monitoring device, and GPS data of an area in which the animal wearing the monitoring device is to be monitored for biometric and location information concerning the animal;

e) launching the animal and Self-Calibrating the animal monitoring device after launch;

f) monitoring the animal by collecting biometric and location data from the animal monitoring device;

g) compiling the information;

h) transmitting the data to a wireless transceiver, i) relaying the information from the wireless transceiver to at least one server;

j) at the server(s) sending the information to the database containing the set of algorithms for determining a plurality of conditions related to the animal;

k) analyzing the information based on the algorithms;

l) determining whether a plurality of conditions related to the animal are present; and m) generating a notification message to a caretaker notifying the caretaker of the condition of the animal.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
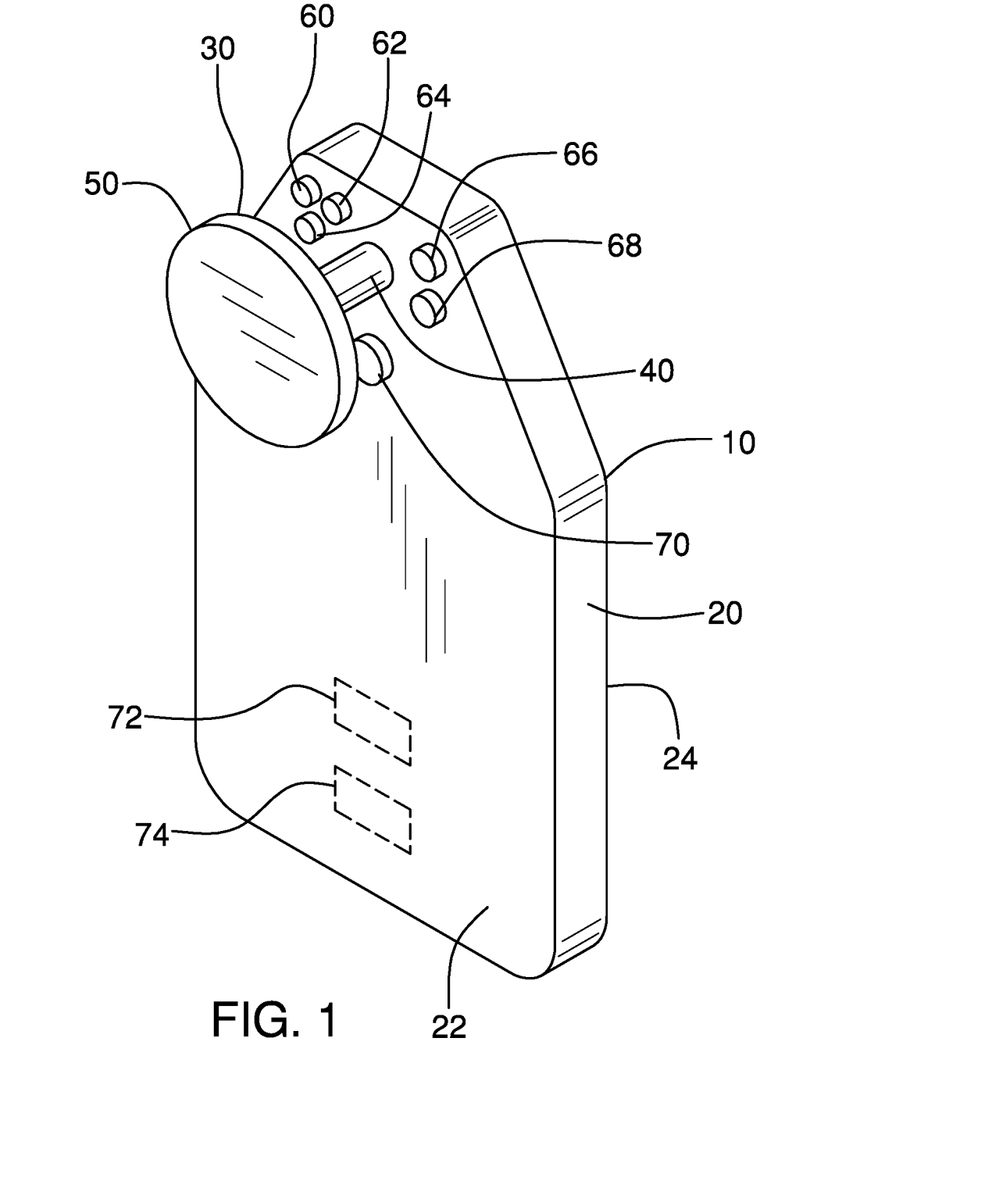
FIG. 1 is a perspective view (left to right) of an animal tag that is a biometric and location monitoring device according to an embodiment of the disclosure.
Figure 2:
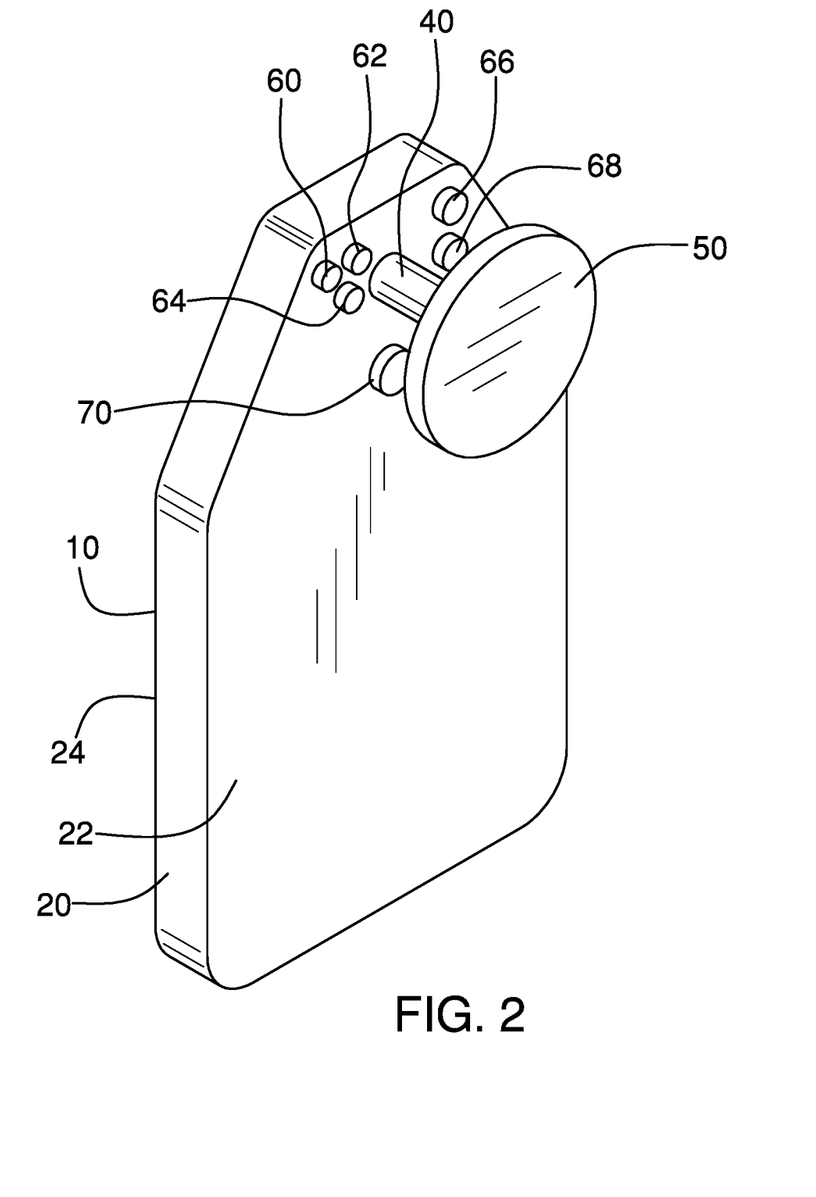
FIG. 2 is a perspective view (right to left) of an embodiment of the disclosure.
Figure 3:
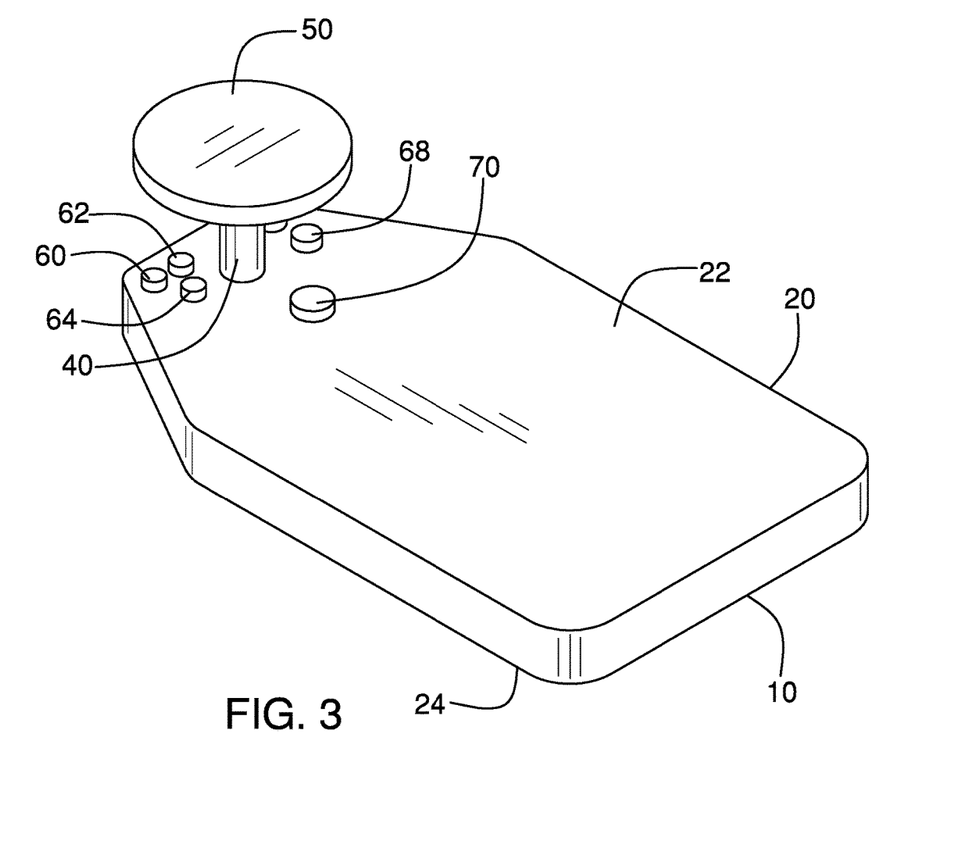
FIG. 3 is a perspective view (bottom to top) of an embodiment of the disclosure.

With reference now to the drawings, and in particular to FIGS. 1 through 3 thereof, a new animal tag embodying the principles and concepts of an embodiment of the disclosure and generally designated by the reference numeral 10 will be described.

As best illustrated in FIGS. 1 through 3, the animal ear tag device 10 generally comprises a unitary housing 20, with a front surface 22 and rear surface 24, and securement means 30 comprising an ear post 40 and ear backing 50 for securing the ear tag device 10 to an ear of an animal (not shown). The housing 20, ear post 30 and ear backing 40 are made of any suitable material, for example any polymeric material known in the art. It should be understood that while the housing 20, or tag, is used as a conventional ear tag, the device 10 may instead be incorporated into other containment systems such as an ankle monitor or implant and therefore may comprise simply a "tag" as opposed to an ear tag.

As best seen in FIGS. 1 and 3, a plurality of sensors 60, 62, 64, 66, 68 and 70 for collecting data concerning an animal being monitored, are located on rear surface 24 so that in use they are positioned facing the animal to monitor the animal. Sensors 60, 62, 64, 66, 68 and 70 may be selected to monitor any parameter. Non-limiting examples of parameters concerning an animal which may be monitored by the device 10 include:
Location
Electronic identification (hereinafter "EID") number
Heart rate
Oxygen saturation
Activity level
Body temperature
Hormones including but not limited to:
    Cortisol
    Estrogen
    Testosterone
    Progesterone
Other hormones as detection capabilities are researched Non-limiting examples of sensors for biometric, location and environmental monitoring include any biomedical sensors, BioZ® (non-invasive hemodynamic monitor commercially available from CardioDynamics International Corporation 6175 Nancy Ridge Drive, Suite 300 San Diego Calif. 92121), oxygen or O2 sensor, SpO2 sensor (SpO2 stands for peripheral capillary oxygen saturation, an estimate of the amount of oxygen in the blood, or percentage of oxygenated hemoglobin to total hemoglobin in the blood), heart rate sensor, $3^{rd}$ generation Hi-Accuracy Pulse Oximeter, electrocardiogram (hereinafter "EKG"), animal temperature sensor, galvanic skin response (hereinafter "GSR") sensor, UVA and UVB sensor, environmental temperature sensor, accelerometer, and GPS. In an embodiment shown, sensors 60, 62, 64, 66, 68 and 70 are GPS, accelerometer, heart rate monitor, O2 monitor, temperature monitor and GSR sensor (which provides a galvanic skin response test for detecting the levels of cortisol of an animal). In one embodiment, the biomedical and location monitoring device 10 includes a MAX86150EFF+T biosensor commercially available from Maxim Integrated Products, Inc. located at 160 Rio Robles San Jose Calif. 95134.

EID 72 may be located within housing 20, but may be located on either front surface 22 or rear surface 24 of housing 20. The inclusion of an EID component will make the tag compliant for source verification purposes.

A wireless transmitter or transceiver 74, is located within housing 20. An indicator display 76 (not shown) may be located on either front surface 22 or rear surface 24 of housing 20. In one embodiment indicator display 76 is an LED 78. The indicator LED 78 may also be used to sort livestock. The wireless transceiver 74 may comprise any conventional radio technology including, for example, Wi-Fi and LoRa.

In use, device 10 will collect data concerning the animal and transmit the data at a set interval to a wireless receiver or transceiver which will relay the data and information to at least one server, and the data will be processed with computer executable instructions or algorithms to determine the general wellness of an animal, identify a particular health condition being monitored, and/or determine a course to be taken in the care of the animal.

Device 10 is capable of monitoring the wellbeing of an animal, and detecting or determining a number of conditions including but not limited to:
Illness
Estrus
Pregnancy
Parturition
Feeding habits
Breeding activity
Precise location of the animal The device and associated software may also be used to indicate with a certain probability the sire of a calf. Some of the courses of action will be to inform the owner or caretaker of the animal or livestock if the animal has a condition. The condition may be transmitted to a computer or handheld device.

Figure 4:
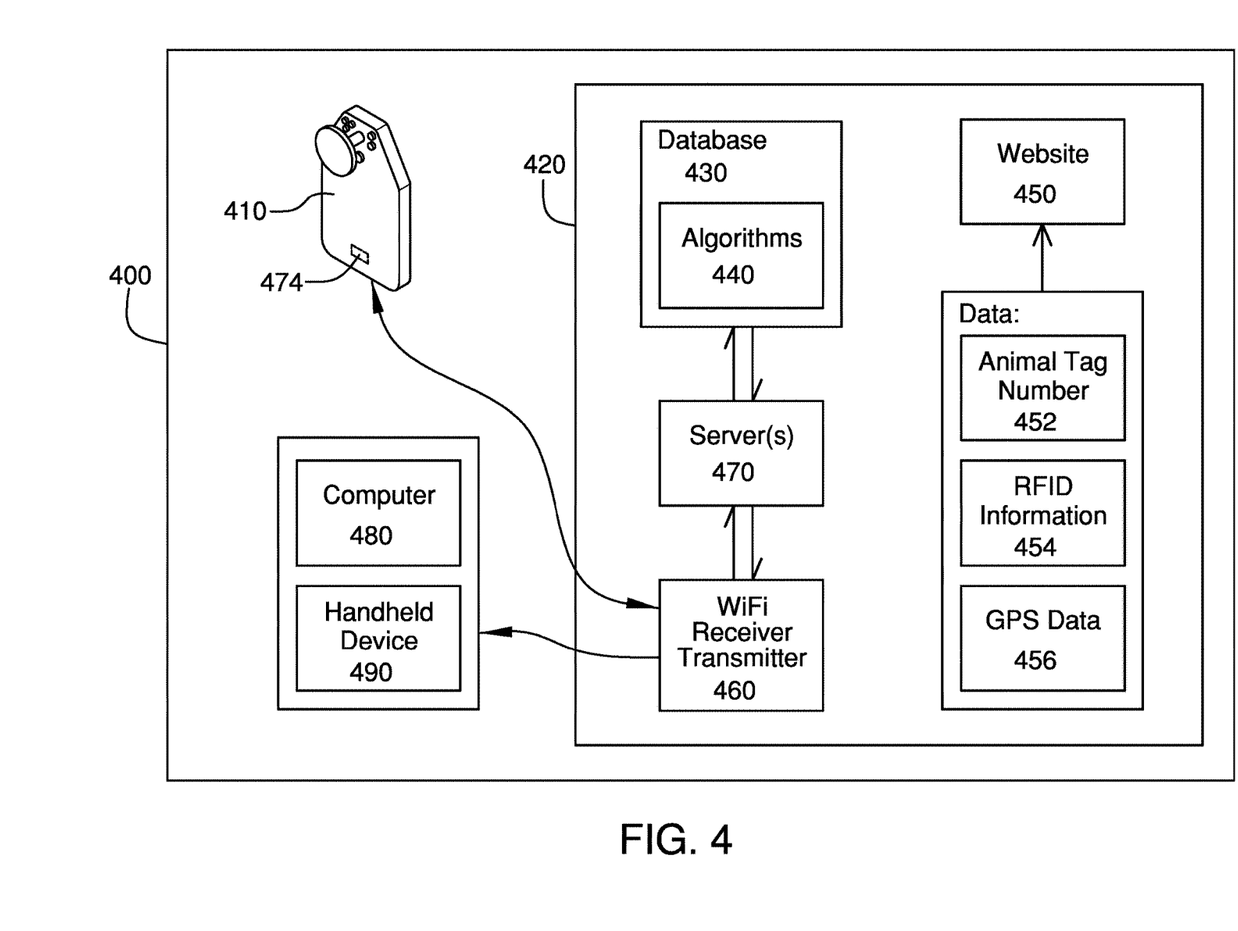
FIG. 4 is a schematic drawing of a system for biometric and location monitoring of an animal, in accordance with an embodiment of the disclosure.

Referring to FIG. 4, one embodiment of the disclosure relates to an apparatus for biometric and location monitoring of an animal. The biometric and location monitoring apparatus 400 comprises an animal identification and monitoring tag 410 for installation on an animal (not shown) to be monitored. The animal tag 410 is capable of collecting and transmitting animal data by a wireless transmitter 474 (which may also be a wireless transceiver which employs conventional radio technology as described above). The apparatus 400 further comprises a biometric and location monitoring system 420 operatively connected to the animal tag 410, the system 420 being capable of analyzing animal data. The system comprises a database 430 containing a set of algorithms 440 for determining a plurality of conditions related to the animal. The system 420 further includes a website 450 into which user data is entered, the data comprising an animal tag number 452 assigned to an animal, RFID information 454 associated with the animal tag 410, and GPS data 456 of an area in which the animal wearing the animal tag is to be monitored for biometric and location information concerning the animal. The system further includes a wireless receiver 460 which may be a wireless transceiver, and at least one server 470. The apparatus is capable of analyzing the information based on the algorithms 440, and determining whether a plurality of conditions related to the animal are present; and generating a notification message to a caretaker notifying the caretaker of the condition of the animal. The message may be displayed on the animal tag device 410, or another computer 480 or handheld device 490.

The animal tag 410 will collect data from the animal related to the behavior and physiology of the animal, and transmit the data to a database 430. The data is analyzed based on algorithms 440 to monitor the animal's wellbeing and detect conditions including but not limited to illness, estrus, pregnancy, parturition, feeding habits, breeding activity, and the precise location of the animal. In addition information related to the location of the animal may be collected.

In one embodiment, the disclosure provides a method of biometric and location monitoring of an animal comprising several steps. The method includes the step of providing a system for biometric and location monitoring of an animal, the system comprising an animal identification and monitoring device operatively connected to a biometric and location monitoring apparatus, the monitoring apparatus comprising a database containing a set of algorithms for determining a plurality of conditions related to the animal. The animal monitoring device is installed on an animal to be monitored.

The method may utilize any animal monitoring device on any animal. The method in one embodiment according to the disclosure may utilize an animal ear tag, and the animal identification number is an animal tag number.

The location or biometric data detected concerning an animal being monitored is analyzed according to the disclosure by algorithms which results in the system generating a description of the animal's physical condition. Several non-limiting examples are provided. When the system detects the animal is outside of the designated area, the system generates a notification that the animal is outside of the GPS area. When the system detects the animal has a high body temperature and a low activity and O2 level, the system generates a notification that the animal has an illness. When the system detects the animal has a high activity level, and the system generates a notification that the animal is overactive. When the system detects the animal has a low activity level, the system generates a notification that the animal is underactive. When the animal is a female, and the system detects the animal has a high heart rate and a high activity level proximal to a sire animal, the system generates a notification that the female animal is in estrus/in heat. Where the system detects an animal previously determined to be in estrus has a predetermined heart rate and O2 level, the system will generates a notification that the animal is pregnant. Where the system detects an animal previously determined to be pregnant has a particular GPS location, duration of pregnancy, heart rate and O2, the system generates a notification that the animal is in parturition/calving. When the system determines the animal is away from a feed bunk for an extended period of time, the system generates a notification that the animal has not been feeding normally. When the system determines a particular GSR level, the system generates a notification that the animal is stressed.

Figure 5:
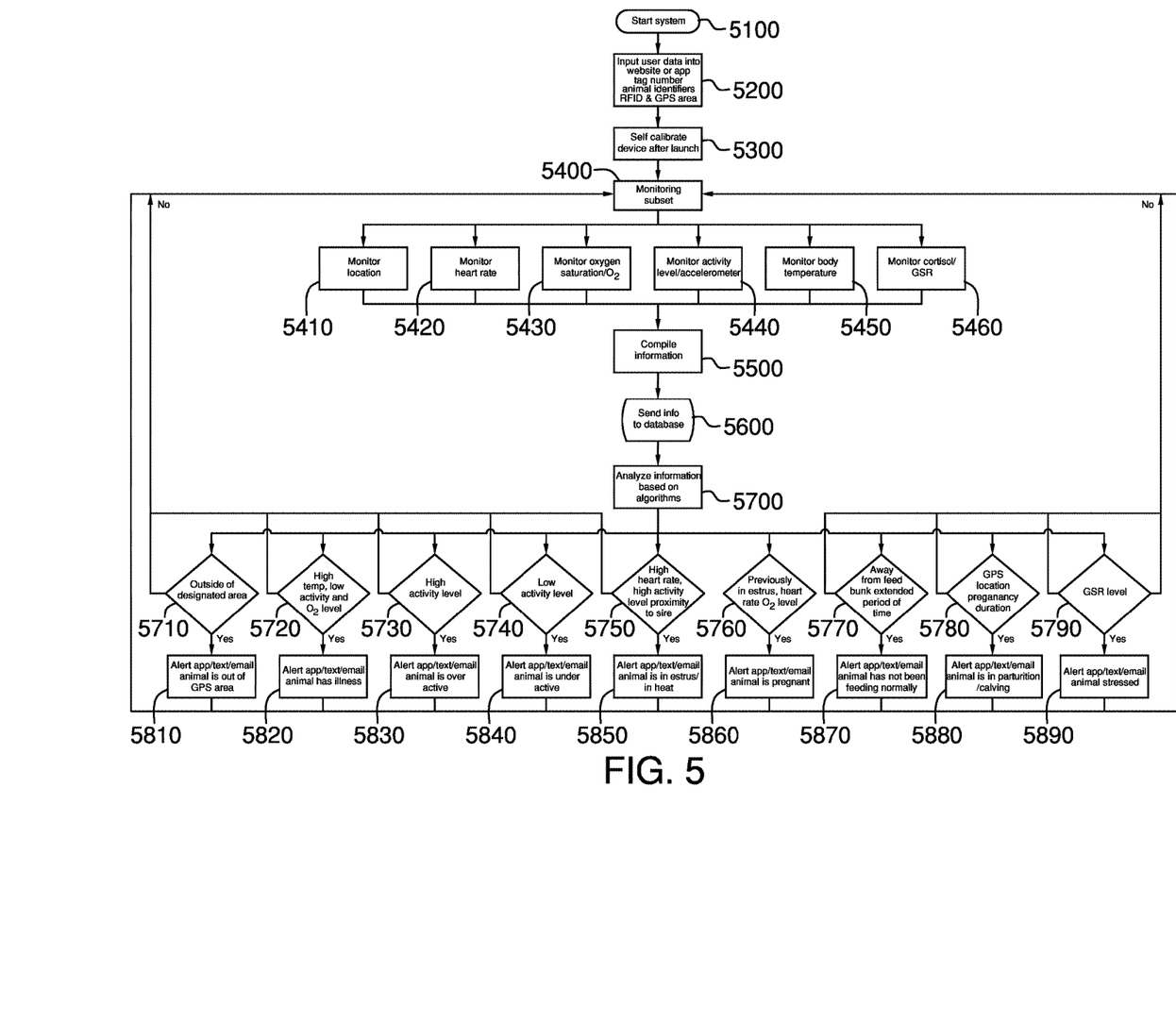
FIG. 5 is a flow chart of a method for biometric and location monitoring of an animal, according to an embodiment of the disclosure.

Referring to FIG. 5, additional steps of the method are described. FIG. 5 is a flow chart of a method in accordance with an embodiment of the disclosure. The method includes the following additional steps:

The system is started (FIG. 5, element 5100).

User data is entered into a website (FIG. 5, element 5200), the data comprising an animal identification number assigned to the animal, RFID information associated with the animal monitoring device, and GPS data of an area in which the animal wearing the monitoring device is to be monitored for biometric and location information concerning the animal.

The animal is launched and the animal monitoring device is self-calibrated after launch (FIG. 5, element 5300).

The animal is monitored by collecting biometric and location data from the animal monitoring device (FIG. 5, element 5400). The biometric and location data may include any biometric or location data known in the art. The data may be is selected from the group consisting of the animal location, animal heart rate, animal oxygen saturation/O2, animal activity level/accelerometer, animal body temperature, and animal cortisol/Galvanic Skin Response (GSR). The biometric data may in one embodiment be the level of any hormone present in the animal. In one embodiment, the hormone may be selected from the group consisting of animal cortisol, animal estrogen, animal testosterone, and animal progesterone.

In one embodiment, the data collected, monitoring sub set (5400), includes:
Monitor Location (5410);
Monitor Heart Rate (5420);
Monitor Oxygen Saturation/O2 (5430);
Monitor Activity Level/Accelerometer (5440);
Monitor Body Temperature (5450); and
Monitor Cortisol/GSR (5460).

The information concerning the animal is compiled (FIG. 5, element 5500). After the data is transmitted to a wireless receiver or transceiver, and relayed from the wireless receiver or transceiver to servers, at the servers, the information is sent to a database (FIG. 5, element 5600). The database contains the set of algorithms for determining a plurality of conditions related to the animal.

The information is analyzed based on the algorithms (FIG. 5, element 5700) and any health condition is determined and communicated to a caregiver.

According to the disclosure, non-limiting examples of the plurality of algorithms upon which the animal data is analyzed and a plurality of health conditions related to the animal may be determined are:

Outside of Designated GPS area: After the user, has designated a predetermined area and the animal has been outside the area for a predetermined time.

Illness: Increased temperature, decreased O2 level, Activity level

Over Active: High heart rate and high activity level for an extended period

Under Active: Low heart rate and low activity level for an extended period

Estrus: Temperature, activity, O2 Level, proximity to sire

Pregnant: Temperature, O2 Level, Activity Level, Previous Estrus

Not Feeding Normally: Location to bunk for period

Parturition: Previously Pregnant, Temperature, O2 level, Heart Rate, Location

Stressed: Heart Rate, Temperature, GSR

Limp/erratic movement: Accelerometer

The system determines whether a plurality of data states related to the animal are present (FIG. 5, elements 5710, 5720, 5730, 5740, 5750, 5760, 5770, 5780 and 5790), and then generates a conclusion of any condition present based on the data which is transmitted as an alert by app/text/email (FIG. 5, elements 5810, 5820, 5830, 5840, 5850, 5860, 5870, 5880, 5890) notifying the caretaker of the health condition of the animal.

According to the disclosure, the plurality of data states related to the animal may include any health related data. Non-limiting examples may include a condition selected form the group consisting of "outside of designated area (FIG. 5, element 5710)", "high temp, low activity, and low O2 level (FIG. 5, element 5720)", "high activity level (FIG. 5, element 5730)", "low activity level (FIG. 5, element 5740)", "high heart rate, high activity level and proximity to sire (FIG. 5, element 5750)", "previously in estrus, heart rate, O2 level (FIG. 5, element 5760)", "away from feed bunk an extended period of time (FIG. 5, element 5770)", "GPS location, pregnancy duration, heart rate, O2 level (FIG. 5, element 5780)", and "GSR level (FIG. 5, element 5790)".

The system may determine one or more biometric or location related conditions present relative to the animal, including Outside of designated area (5810), Illness (5820), Overactive (5830), Underactive (5840), Estrus/In Heat (5850), Pregnant (5860), Not Feeding Normally (5870), Parturition/Calving (5880), and Stressed (5890). The system responds to these conditions by generating an alert and message. These are further described below.

Outside of Designated Area (5710). If the animal is outside the designated area, the system generates an alert that the animal is out of the GPS area (5810).

If the system reads the animal has high temp, low activity level and O2 Level (5720), the system generates an alert that the animal has an Illness (5820).

If the system reads the animal has a High activity Level (5730), the system generates an alert app/text/email animal is Over Active (5830).

If the system detects a low Activity Level (5740), the system generates an alert that the animal is Under Active (5840).

If the system reads the animal has a High heart rate, High activity Level Proximity to Sire (5750), the system generates an alert that the animal is in Estrus/In Heat (5850).

If the system reads the animal was previously in Estrus, and has a particular Heart rate and O2 level (5760), the system generates an alert that the animal is Pregnant (5860).

If the system determines the animal is away from feed bunk extended period of time (5770), the system generates an alert that the animal has not been feeding normally (5870).

If the system reads a particular GPS location, pregnancy duration, HR and O2 (5780), the system generates an alert that the animal is in Parturition/Calving (5880).

If the system determines a particular GSR Level (5790), the system generates an alert that the animal is Stressed (5890).

The system checks each of these algorithms, and proceeds to the next set of parameters whether a condition requiring an alert message is detected.

The notification to the caretaker may be any suitable notification. Non-limiting examples include an alert, an app, or a text received and displayed on a device associated with the system such as a computer or a handheld device. The notification may include an audible alarm. The notification messages may indicate any health related condition. Non-limiting examples pf include conditions selected from the group consisting of "outside of designated GPS area (FIG. 5, element 5810)", "illness (FIG. 5, element 5820)", "overactive (FIG. 5, element 5830)", "underactive (FIG. 5, element 5840)", "estrus/in heat (FIG. 5, element 5850)", "pregnant (FIG. 5, element 5860)", "not feeding normally (FIG. 5, element 5870", "parturition/calving (FIG. 5, element 5880)", and "stressed (FIG. 5, element 5890)".

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A method of biometric and location monitoring of an animal comprising the steps of:
   a) providing a system for biometric and location monitoring of an animal, the system comprising:
      i) an animal tag device which includes a plurality of biometric and location sensors; and
      ii) a biometric and location monitoring apparatus operatively connected to the device and being capable of analyzing animal data, the monitoring apparatus comprising:
         A) a website into which user data is entered, the data comprising an identification number of an animal tag assigned to the animal being monitored, RFID information associated with the animal tag, and GPS data of an area in which the animal wearing the animal tag is to be monitored for biometric and location information concerning the animal;
B) a wireless transceiver;
C) at least one server; and
D) a database containing the set of algorithms for determining a plurality of conditions related to the animal;
b) installing the animal tag device on an animal to be monitored;
c) starting the system;
d) entering user data into the website, the data comprising an animal identification number assigned to the animal tag device, RFID information associated with the animal monitoring device, and GPS data of an area in which the animal wearing the monitoring device is to be monitored for biometric and location information concerning the animal;
e) launching the animal and self-calibrating the animal tag device after launch;
f) monitoring the animal by collecting biometric and location data from the animal tag device;
g) compiling the information;
h) transmitting the data to the wireless transceiver,
i) relaying the information from the wireless transceiver to the at least one server;
j) at the at least one server, sending the information to the database containing the set of algorithms for determining a plurality of conditions related to the animal;
k) analyzing the information based on the algorithms;
l) determining whether a plurality of conditions related to the animal are present; and
m) generating a notification message to a caretaker notifying the caretaker of the condition of the animal.

2. The method of claim 1 wherein the biometric and location data is selected from the group consisting of the animal location, animal heart rate, the animal oxygen saturation/O2, animal activity level/accelerometer, animal body temperature, animal cortisol/Galvanic Skin Response (GSR).

3. The method of claim 1 wherein the biometric data is the level of a hormone present in the animal.

4. The method of claim 3 wherein the hormone is selected from the group consisting of animal cortisol, animal estrogen, animal testosterone, and animal progesterone.

5. The method of claim 1 wherein the plurality of conditions related to the animal are selected from the group consisting of "outside of designated area", "illness", "overactive", "underactive", "estrus/in heat", "pregnant", "parturition/calving", and "not feeding normally".

6. The method of claim 1 wherein the notification to the caretaker is an alert, an app, or a text received and displayed on a device associated with the system.

7. The method of claim 6 wherein the notification includes an audible alarm.

8. The method of claim 6 wherein the alert/app/text indicates a condition selected from the group consisting of "outside of designated area", "illness", "overactive", "underactive", "estrus/in heat", "pregnant" and "stressed", "parturition/calving", and "not feeding normally".

9. The method of claim 8 wherein the system detects the animal is outside of the designated area and the system generates a notification that the animal is outside of the GPS area.

10. The method of claim 8 wherein the system detects the animal has a high body temperature, a low activity and O2 level, and the system generates a notification that the animal has an illness.

11. The method of claim 8 wherein the system detects the animal has a high activity level, and the system generates a notification that the animal is overactive.

12. The method of claim 8 wherein the system detects the animal has a low activity level, and the system generates a notification that the animal is underactive.

13. The method of claim 8 wherein the animal is a female, and wherein the system detects the animal has a high heart rate and a high activity level proximal to a sire animal, and the system generates a notification that the female animal is in estrus/in heat.

14. The method of claim 8 wherein the animal is a female previously in Estrus, and wherein the system detects the animal has a predetermined heart rate and O2 level, and the system generates a notification that the animal is pregnant.

15. The method of claim 8 wherein an animal previously determined to be pregnant and the system reads a particular GPS location, duration of pregnancy, heart rate and O2, and the system generates a notification that the animal is in parturition/calving.

16. The method of claim 8 wherein the system determines the animal is away from a feed bunk for an extended period of time, and the system generates a notification that the animal has not been feeding normally.

17. The method of claim 8 wherein the system determines a particular GSR level, and the system generates a notification that the animal is stressed.

18. An apparatus for biometric and location monitoring of an animal, the apparatus comprising:
a) an animal tag for installation on an animal to be monitored, the tag comprising a plurality of sensors to monitor animal biometric and location data, and further being capable of collecting and transmitting the animal biometric and location data; and
b) a biometric and location monitoring system operatively connected to the animal and identification monitoring tag, the monitoring system being capable of analyzing animal data, the system comprising:
i) a website into which user data is entered, the data comprising an identification number of the animal tag device assigned to the animal being monitored, RFID information associated with the animal tag device, and GPS data of an area in which the animal wearing the animal tag device is to be monitored for biometric and location information concerning the animal;
ii) a wireless transceiver;
iii) at least one server; and
iv) a database containing the set of algorithms for determining a plurality of conditions related to the animal;
the apparatus being capable of analyzing the information based on the algorithms, determining whether a plurality of conditions related to the animal are present; and
generating a notification message to a caretaker notifying the caretaker of the condition of the animal.

19. The apparatus of claim 18 wherein the biometric and location data is selected from the group consisting of the animal location, animal heart rate, the animal oxygen saturation/O2, animal activity level/accelerometer, animal body temperature, animal cortisol/Galvanic Skin Response (GSR); and the plurality of conditions related to the animal are selected from the group consisting of "outside of designated area", "illness", "overactive", "underactive", "estrus/in heat", "pregnant", "parturition/calving", and "not feeding normally".

20. The apparatus of claim 19 wherein the notification to the caretaker is an alert, an app, or a text received and displayed on a device associated with the system, the notification displaying at least one of the plurality of conditions related to the animal.

\* \* \* \* \*